United States Patent
Kaneshiro et al.

(10) Patent No.: US 9,851,210 B2
(45) Date of Patent: Dec. 26, 2017

(54) MAP INFORMATION PROCESSING APPARATUS, MAP INFORMATION PROCESSING METHOD, AND METHOD FOR ADJUSTING UPDATE DATA

(71) Applicant: MITSUBISHI ELECTRIC CORPORATION, Tokyo (JP)

(72) Inventors: Hironobu Kaneshiro, Hyogo (JP); Seigo Kanazawa, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/103,425

(22) PCT Filed: Feb. 21, 2014

(86) PCT No.: PCT/JP2014/054111
§ 371 (c)(1),
(2) Date: Jun. 10, 2016

(87) PCT Pub. No.: WO2015/125265
PCT Pub. Date: Aug. 27, 2015

(65) Prior Publication Data
US 2016/0313131 A1 Oct. 27, 2016

(51) Int. Cl.
*G06G 7/00* (2006.01)
*G01C 21/32* (2006.01)
*G09B 29/10* (2006.01)

(52) U.S. Cl.
CPC .......... *G01C 21/32* (2013.01); *G09B 29/106* (2013.01); *G09B 29/108* (2013.01)

(58) Field of Classification Search
USPC ........................................... 701/14
See application file for complete search history.

(56) References Cited

U.S. PATENT DOCUMENTS

| | | | | |
|---|---|---|---|---|
| 6,154,152 A | * | 11/2000 | Ito | G01C 21/32 340/988 |
| 2005/0248485 A1 | * | 11/2005 | Hatch | G01S 19/43 342/357.26 |
| 2007/0032946 A1 | * | 2/2007 | Goto | G01C 21/32 701/93 |

(Continued)

FOREIGN PATENT DOCUMENTS

| | | |
|---|---|---|
| JP | 09-269726 A | 10/1997 |
| JP | 11-119647 A | 4/1999 |

(Continued)

*Primary Examiner* — Tyler Paige
(74) *Attorney, Agent, or Firm* — Birch, Stewart, Kolasch & Birch, LLP

(57) ABSTRACT

The present invention has an object to provide a technique capable of reducing the size of update data. A map information processing apparatus includes a data extractor that extracts a difference between a shape of a past road link and a shape of a current road link as update data for updating predetermined map information. The data extractor does not extract the difference as the update data in a case where one road link of the past road link and the current road link is included in a buffer region obtained by extending the shape of the other road link by a predetermined distance.

13 Claims, 15 Drawing Sheets

(56) References Cited

U.S. PATENT DOCUMENTS

| | | | |
|---|---|---|---|
| 2008/0021638 A1* | 1/2008 | Kobayashi | G01C 21/30 |
| | | | 701/532 |
| 2009/0019095 A1* | 1/2009 | Asahara | G01C 21/32 |
| 2010/0161219 A1* | 6/2010 | Lo | G01C 21/32 |
| | | | 701/532 |
| 2010/0274472 A1* | 10/2010 | Sakai | G01C 21/32 |
| | | | 701/532 |
| 2011/0191285 A1* | 8/2011 | Sawai | G06F 17/30241 |
| | | | 707/602 |
| 2011/0202271 A1* | 8/2011 | Kruithof | G01C 21/32 |
| | | | 701/533 |
| 2013/0006925 A1* | 1/2013 | Sawai | G06F 17/30241 |
| | | | 707/609 |
| 2013/0245936 A1* | 9/2013 | Ando | G01C 21/12 |
| | | | 701/501 |
| 2014/0107816 A1* | 4/2014 | Guedalia | G06F 19/3481 |
| | | | 700/91 |
| 2014/0278055 A1* | 9/2014 | Wang | G01C 21/32 |
| | | | 701/409 |

FOREIGN PATENT DOCUMENTS

| | | |
|---|---|---|
| JP | 2005-283426 A | 10/2005 |
| JP | 2008-250723 A | 10/2008 |
| JP | 2012-098524 A | 5/2012 |
| JP | 2012-117906 A | 6/2012 |
| JP | 2012-181040 A | 9/2012 |

\* cited by examiner

F I G . 1
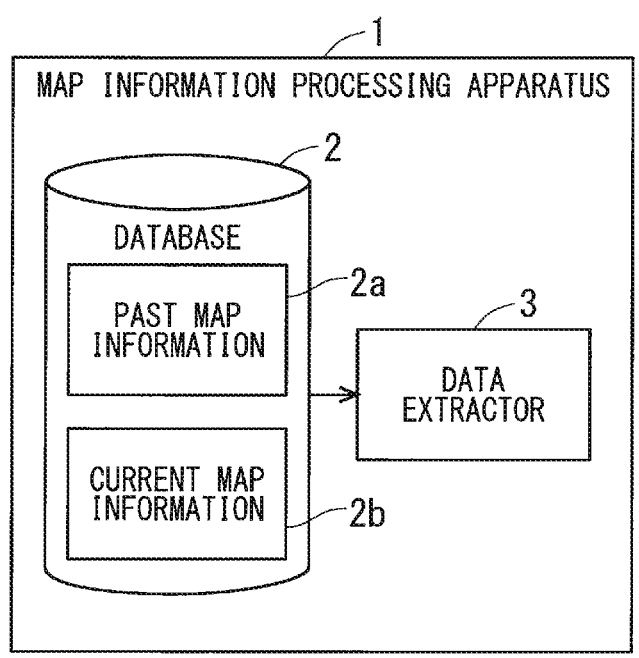

FIG. 2
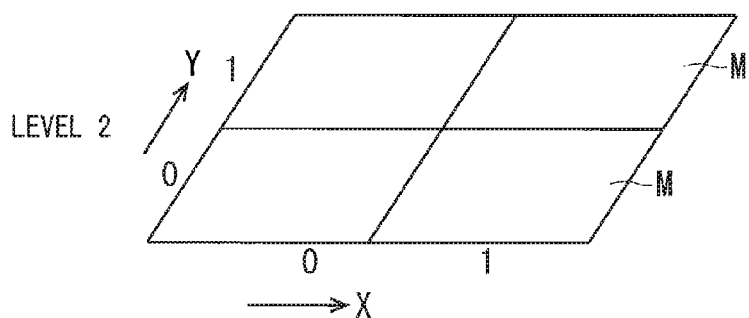
LEVEL 2
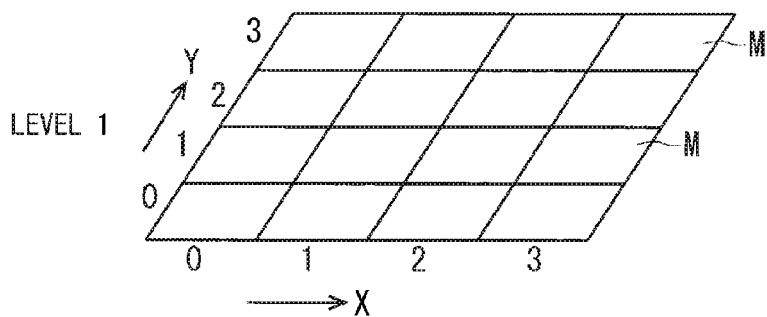
LEVEL 1
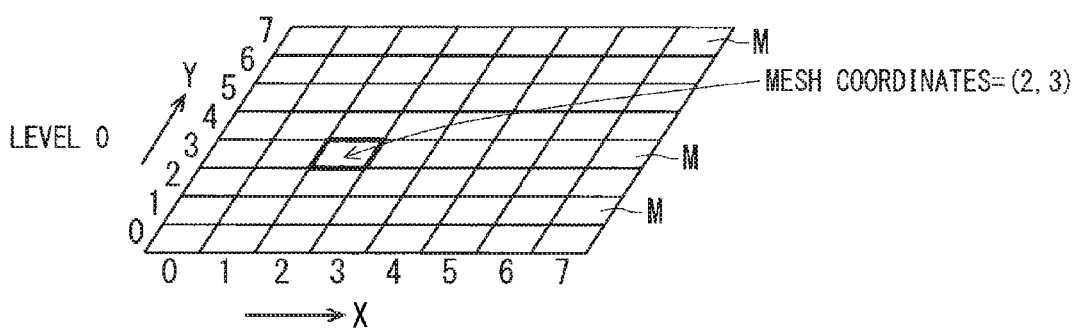
LEVEL 0

FIG. 3
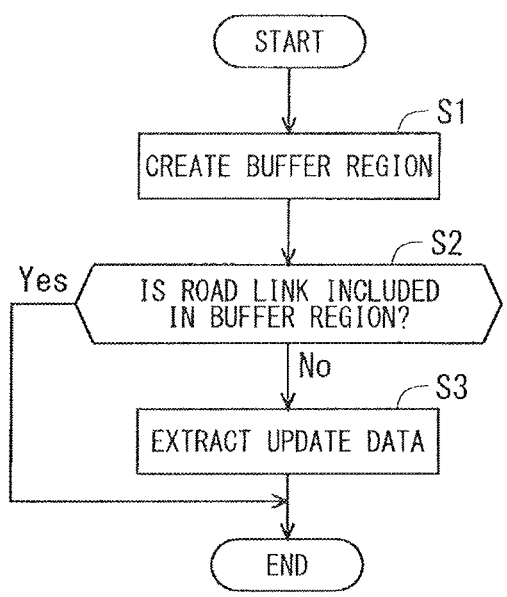
FIG. 4A    FIG. 4B    FIG. 4C
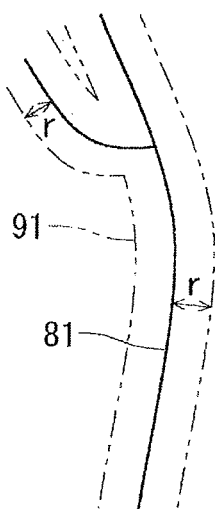 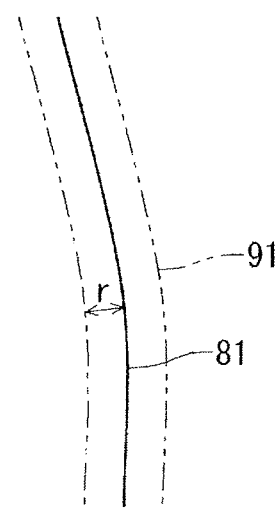 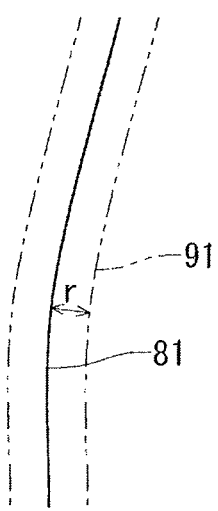

F I G. 5A 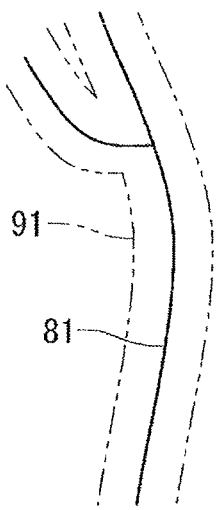
F I G. 5B 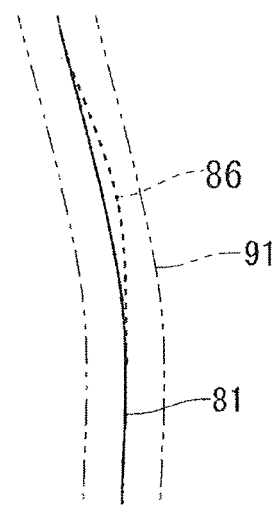
F I G. 5C 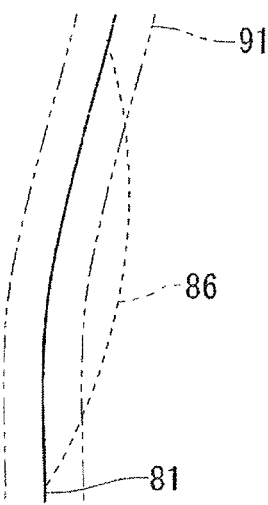
F I G. 6
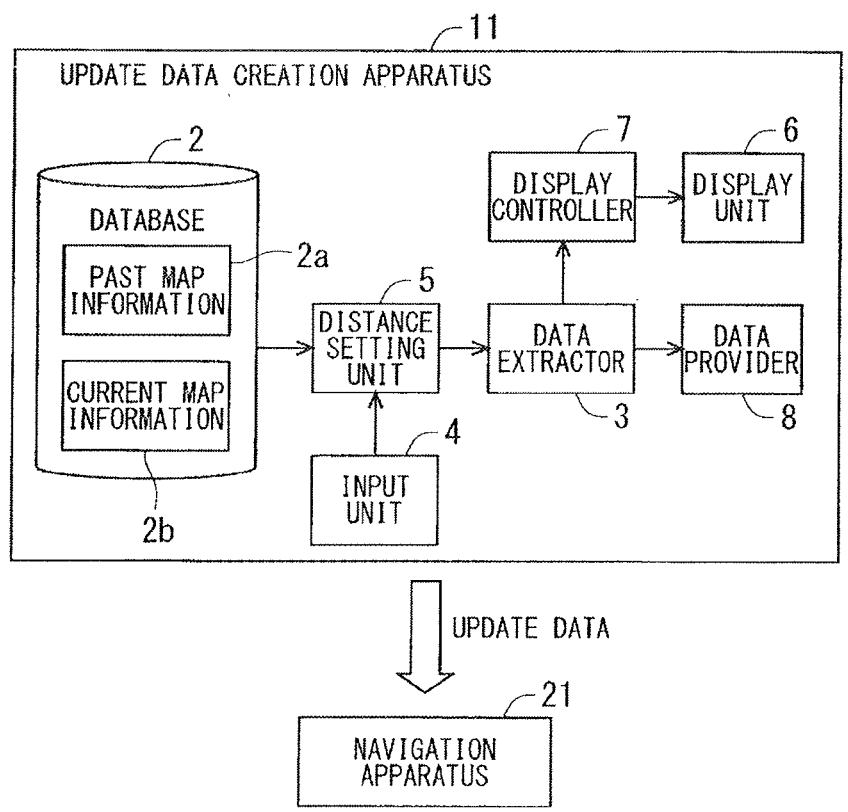

F I G. 9 A
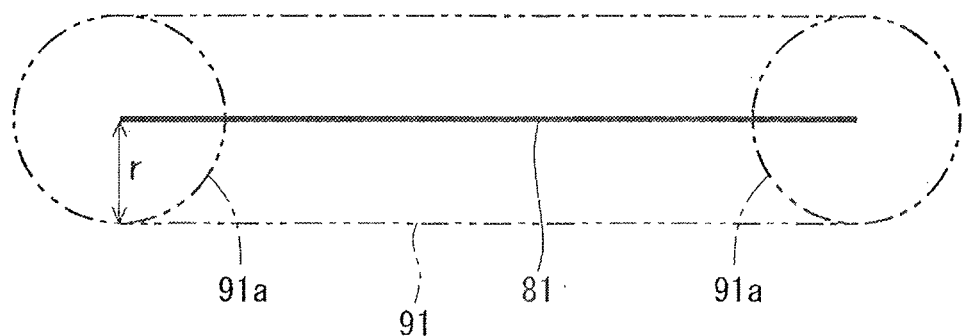
F I G. 9 B
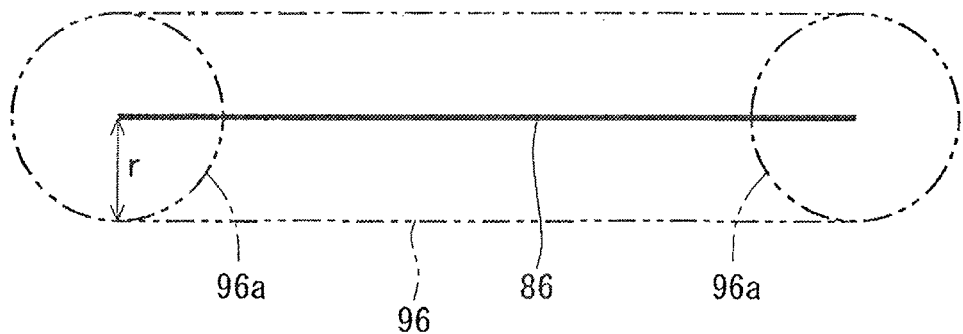
F I G. 1 0
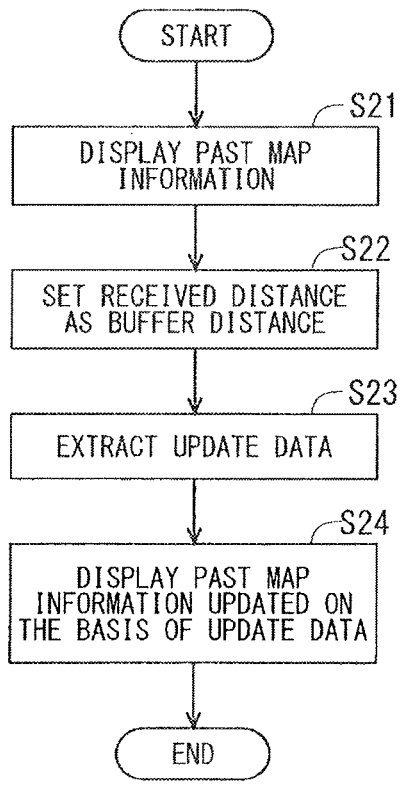

F I G . 1 8
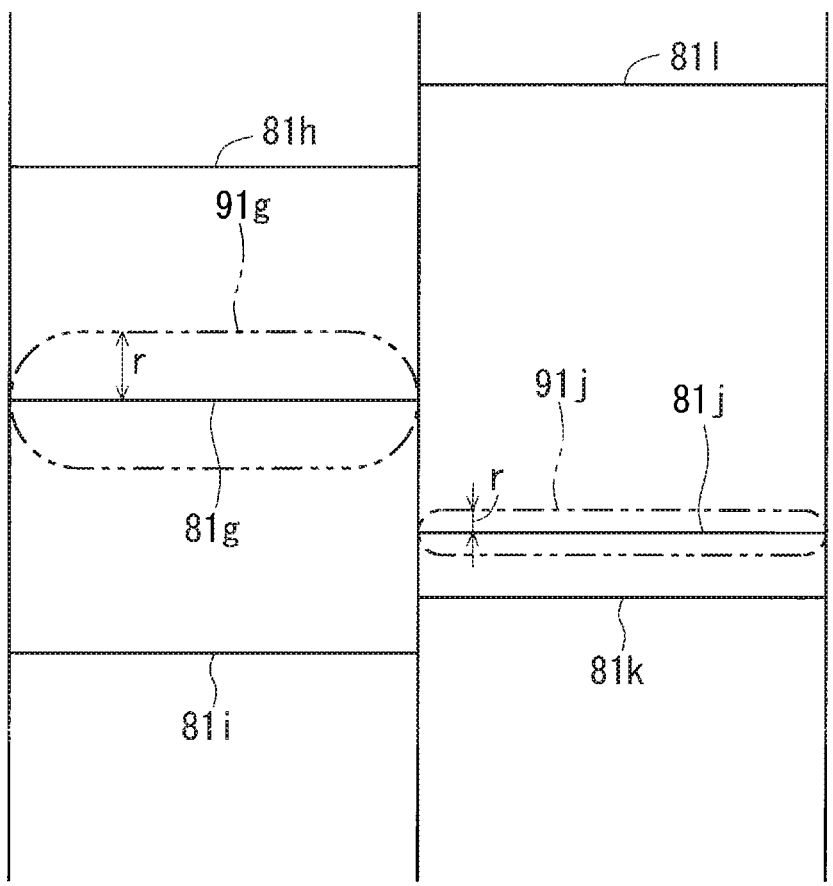

MAP INFORMATION PROCESSING APPARATUS, MAP INFORMATION PROCESSING METHOD, AND METHOD FOR ADJUSTING UPDATE DATA

TECHNICAL FIELD

The present invention relates to a map information processing apparatus, a map information processing method, and a method for adjusting update data.

BACKGROUND ART

Difference-based updating of map information is known which updates past map information to current map information (new map information) by receiving a difference between the past map information and the current map information (a change from the past map information to the current map information) and adding the details of the difference to the past map information.

Various techniques have been proposed which relates to the difference-based updating of map information and the extraction of differences between the past map information and the current map information as update data. For example, in Patent Document 1 is disclosed a technique of reducing the size of the update data by confining a target area of updating map information within an area such as a destination and an area on a route.

PRIOR ART DOCUMENT

Patent Document

Patent Document 1: Japanese Patent Application Laid-Open No. 2012-181040

SUMMARY OF INVENTION

Problem to be Solved by the Invention

The conventional difference-based updating of map information extracts, as the update data, a small difference that does not cause changes in the actual conditions, such as an error in measuring a road link, and a difference that is smaller than the resolution of the map format and not displayed even if the updating is performed. Consequently, the size of the update data becomes greater than necessary.

The present invention therefore has been made in view of the above-mentioned problem, and an object thereof is to provide a technique capable of reducing the size of update data.

Means to Solve the Problem

A map information processing apparatus according to the present invention includes a receiver and a data extractor. The receiver receives past map information including a past road link and current map information including a current road link. The data extractor extracts a difference between a shape of the past road link and a shape of the current road link as update data for updating predetermined map information. The data extractor does not extract the difference as update data in a case where one road link of the past road link and the current road link is included in a buffer region obtained by extending the shape of the other road link by a predetermined distance.

Effects of the Invention

According to the present invention, the difference is not extracted as update data in a case where the one road link of the past road link and the current road link is included in the buffer region obtained by extending the shape of the other road link by the predetermined distance, and the size of the update data can be reduced accordingly.

These and other objects, features, aspects and advantages of the present invention will become more apparent from the following detailed description of the present invention when taken in conjunction with the accompanying drawings.

BRIEF DESCRIPTION OF DRAWINGS

FIG. 1 A block diagram showing an example of a configuration of a map information processing apparatus according to a first preferred embodiment.

FIG. 2 A diagram showing an example of map information.

FIG. 3 A flowchart showing an example of operation of the map information processing apparatus according to the first preferred embodiment.

FIGS. 4A, 4B and 4C Diagrams for describing an example of operation of the map information processing apparatus according to the first preferred embodiment.

FIGS. 5A, 5B and 5C Diagrams for describing an example of operation of the map information processing apparatus according to the first preferred embodiment.

FIG. 6 A block diagram showing an example of a configuration of an update data creation apparatus according to a second preferred embodiment.

FIGS. 9A and 9B Diagrams for describing an example of operation of the update data creation apparatus according to the second preferred embodiment.

FIG. 10 A flowchart showing an example of a method for adjusting update data according to the second preferred embodiment.

FIG. 18 A diagram for describing an example of operation of the update data creation apparatus according to the fifth preferred embodiment.

DESCRIPTION OF EMBODIMENTS

Figure 7:
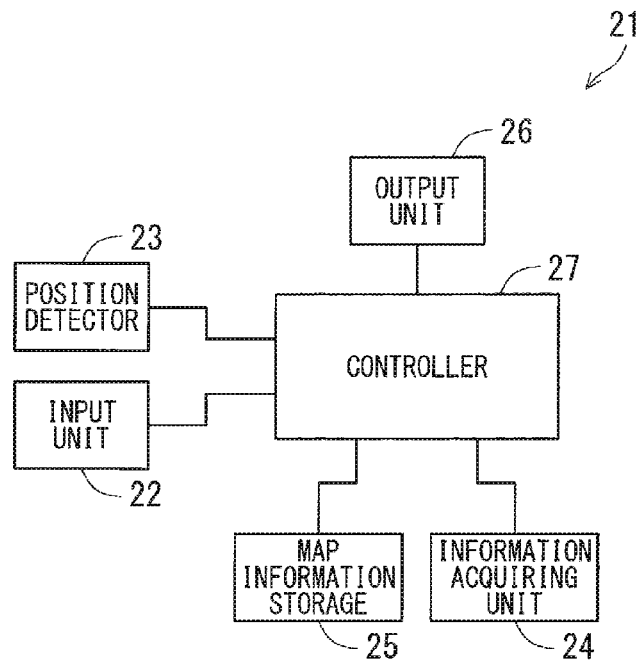
FIG. 7 A block diagram showing an example of a configuration of a navigation apparatus according to the second preferred embodiment.

<First Preferred Embodiment>
<Configuration of Map Information Processing Apparatus>

FIG. 1 is a block diagram showing an example of a configuration of a map information processing apparatus 1 according to a first preferred embodiment of the present invention. The map information processing apparatus 1 includes a database 2 and a data extractor 3. The functions of the data extractor 3 are enabled in the map information processing apparatus 1 by a central processing unit (CPU) (not shown) executing programs stored in a memory (not shown) and the like of the map information processing apparatus 1.

The database 2 (an acquiring unit) acquires past map information 2a and current map information 2b from the outside of the map information processing apparatus 1 and stores the past map information 2a and the current map information 2b. The past map information 2a includes past road links and the current map information 2b includes current road links. Road links refer to roads in individual sections obtained by dividing a road on a map at nodes corresponding to intersections and the like.

The data extractor 3 extracts a difference between the shape of a past road link and the shape of a current road link as update data for updating predetermined map information. Note that the data extractor 3 does not extract the above-mentioned difference as the update data in a case where the current road link is included in a buffer region obtained by extending the shape of the past road link by a predetermined distance as will be described below in detail.

<Map Information>

FIG. 2 is a diagram showing an example of map information applicable to the past map information 2a and the current map information 2b. The creation range (display range) of the map information is, for example, a rectangular region surrounded by latitude lines and longitude lines. The map information is hierarchically organized in accordance with the degree of detailedness of the information and is managed in a state where the creation range of the map information is partitioned into rectangular mesh regions each surrounded by two longitude lines and two latitude lines with a spacing corresponding to the relevant level of the hierarchy.

The map information shown in FIG. 2 is organized in a three-level hierarchy including Level 0, Level 1, and Level 2, with the detailedness increasing in order of decreasing level number. In particular, the creation range is partitioned into an 8 by 8 matrix of mesh regions M at Level 0, the creation range is partitioned into a 4 by 4 matrix of mesh regions M at Level 1, and the display range is partitioned into a 2 by 2 matrix of mesh regions M at Level 2.

The mesh regions M include mesh coordinates (X, Y) assigned thereto such that the individual mesh regions M are distinguishable from one another. For example, as mesh coordinates X of the mesh regions M, numbers 0, 1, 2, . . . are assigned to the mesh regions M in order from the leftmost mesh region M to the rightmost mesh region M. As mesh coordinates Y of the mesh regions M, numbers 0, 1, 2, . . . are assigned to the mesh regions M in order from the lowermost mesh region M to the uppermost mesh region M. The information on the mesh regions M into which the map information is divided as mentioned above is referred to as "mesh information."

<Operation>

FIG. 3 is a flowchart showing an example of operation of the map information processing apparatus 1 according to the first preferred embodiment. With reference to FIG. 3, the following describes the operation of the map information processing apparatus 1 in extracting the update data. Assume that the operation shown in FIG. 3 is performed on, for example, each road link.

In Step S1, the data extractor 3 creates a buffer region obtained by extending the shape of the past road link included in the past map information 2a by a predetermined distance.

FIGS. 4A, 4B and 4C are diagrams for describing an example of the operation of the map information processing apparatus 1 (the operation of the data extractor 3 in Step S1) according to the first preferred embodiment. FIGS. 4A, 4B and 4C each show a past road link 81 and a buffer region of the past road link 81. In Step S1, a buffer region obtained by extending the shape of the past road link 81 by a predetermined distance (a distance r in this case) is created as a past buffer region 91. The predetermined distance r is hereinafter referred to as a "buffer distance r."

Referring back to FIG. 3, in Step S2, the data extractor 3 determines whether the current road link in the current map information 2b is included in the buffer region (the past buffer region 91 in this case). If it is determined that the current road link is included in the buffer region, the operation in FIG. 3 is ended. If it is determined that the current road link is not included in the buffer region, the operation proceeds to Step S3.

FIGS. 5A, 5B and 5C are diagrams for describing an example of operation of the map information processing apparatus 1 according to the first preferred embodiment. In addition to the past buffer region 91 and the like in each of FIGS. 4A, 4B and 4C, a current road link 86 is shown by a broken line in each of FIGS. 5B and 5C. In a case where the current road link 86 is included in the past buffer region 91 as shown in FIG. 5B, the operation in FIG. 3 is ended.

In a case where the current road link 86 is not included in the past buffer region 91 as shown in FIG. 5C, the data extractor 3 extracts, in Step S3, the difference between the shape of the past road link 81 and the shape of the current road link 86 as the update data. Then, the operation in FIG. 3 is ended.

<Effects>

In the map information processing apparatus 1 according to the first preferred embodiment mentioned above, in a case where the current road link 86 is included in the past buffer region 91 as in FIG. 5B, the data extractor 3 does not extract the difference between the shape of the past road link 81 and the shape of the current road link 86 as the update data. This eliminates the need for extracting, as the update data, a small difference that does not cause changes in the actual conditions, such as an error in measuring a road link, and a difference smaller than the resolution of the map format. The size of the update data can be reduced accordingly. Thus, the communication traffic in transmitting the update data to another apparatus or the storage capacity of a storage medium can be reduced, and the amount of mathematical operations (the amount of computation) in updating the map information can be also reduced.

The above-mentioned extraction of the update data may be performed at one level of the hierarchy associated with the map information described with reference to FIG. 2, or may be performed at a plurality of levels of the hierarchy. The buffer distance r may be changed corresponding to the relevant level of hierarchy.

In the above description, the data extractor 3 has been configured not to extract the above-mentioned difference as the update data in a case where the current road link is included in the buffer region obtained by extending the shape of the past road link by the predetermined distance. Alternatively, the data extractor 3 may be configured not to extract the above-mentioned difference as the update data in a case where the past road link is included in the buffer region obtained by extending the shape of the current road link by a predetermined distance as will be described below in another preferred embodiment. That is, it is only required that the data extractor 3 be configured not to extract the above-mentioned difference as the update data in a case where one road link of the past road link and the current road link is included in the buffer region obtained by extending the shape of the other road link by the predetermined distance.

The data extractor 3 may be configured to extract not only the difference in the shapes of the road links but also differences in attribute information (such as the presence or absence of tunnels, changes in the number of lanes, and changes in a background that are associated with the road links).

<Second Preferred Embodiment>

In a second preferred embodiment of the present invention, the map information processing apparatus 1 described in the first preferred embodiment is applied to an update data creation apparatus used by, for example, suppliers who create update data. FIG. 6 is a block diagram showing an example of a configuration of the update data creation apparatus. Note that constituent elements of an update data creation apparatus 11 according to the second preferred embodiment that are identical or similar to the above-described constituent elements are denoted by the same reference signs, and the following description will be given focusing on the points of difference.

FIG. 6 shows not only the update data creation apparatus 11 but also a navigation apparatus 21 that uses update data created by the update data creation apparatus. The navigation apparatus 21 may be, for example, a car navigation apparatus, a portable navigation device (PND), a mobile terminal (such as a mobile phone, a smart phone, and a tablet). The following describes, in detail, configurations of the update data creation apparatus 11 and the navigation apparatus 21.

<Configuration of Update Data Creation Apparatus>

The update data creation apparatus 11 includes the database 2, the data extractor 3, an input unit 4, a distance setting unit 5, a display unit 6, a display controller 7, and a data provider 8. A CPU (not shown) of the update data creation apparatus 11 executes programs stored in a memory (not shown) or the like of the update data creation apparatus 11, so that the functions of the data extractor 3, the distance setting unit 5, the display controller 7, or the like are enabled in the update data creation apparatus 11.

For example, the input unit 4 includes a key board and a mouse or includes a touch panel, and receives actions of the user.

The distance setting unit 5 sets, as the buffer distance r, a distance received by the input unit 4 from the user. Thus, in the update data creation apparatus 11 according to the second preferred embodiment, the buffer distance r of the buffer region can be changed to a distance desired by the user. Note that the distance setting unit 5 may use a predetermined default value to set the buffer distance r.

The database 2 and the data extractor 3 are similar to the database 2 and the data extractor 3 described in the first preferred embodiment. Note that, as will be described below in detail, the data extractor 3 according to the second preferred embodiment creates the above-mentioned buffer region on the basis of a circle having a radius equal to the buffer distance r set by the distance setting unit 5, with the center of the circle being located on a road link.

The display unit 6 includes, for example, a liquid crystal display, and displays the update status of the past map information 2a and the like on the basis of the update data extracted by the data extractor 3. The updating of the past map information 2a on the basis of the update data may be executed by the CPU (not shown) of the update data creation apparatus 11 or may be executed by the display controller 7 or the like.

As will be described below in detail, the display controller 7 causes the display unit 6 to display the update status of the past map information 2a on the basis of the update data in such a manner that a road link from which the above-mentioned difference has been extracted as the update data, a road link from which the above-mentioned difference has not been extracted as the update data, and a road link other than the above-mentioned road links are distinguishable from one another.

The data provider 8 includes, for example, a memory card writer or a digital versatile disk (DVD) writer, and writes the update data extracted by the data extractor 3 onto a storage medium such as a memory card or a DVD. The data provider 8 may be a communication apparatus capable of transmitting the update data to the navigation apparatus 21 through radio communication and the like.

<Configuration of Navigation Apparatus>

The navigation apparatus 21 reads the update data from the storage medium or receives the update data from the communication apparatus, and updates, out of the map information, the map information on a given region desired by the user at all levels of the hierarchy on the basis of the update data. FIG. 7 is a block diagram showing an example of a configuration of the navigation apparatus 21 according to the second preferred embodiment. The navigation apparatus 21 in FIG. 7 includes an input unit 22, a position detector 23, an information acquiring unit 24, a map information storage 25, an output unit 26, and a controller 27 that performs overall control thereof.

The input unit 22 provides an instruction signal to the controller 27 in accordance with an action of the user. In particular, the input unit 22 may include at least one of a voice recognition apparatus (not shown) that recognizes a voice of the user and outputs instruction signals based on the voice, a button and a touch panel (not shown) that output instruction signals in response to a manual action of the user, and another appropriate input apparatus.

The position detector 23 detects the current position of the navigation apparatus 21 through the use of the global positioning system (GPS) receiver, a vehicle speed sensor, an angular speed sensor, and the like, and outputs information on the detected position to the controller 27.

The information acquiring unit 24 includes, for example, a memory card reader and acquires (reads) information including update data stored in the memory card. The information acquiring unit 24 is not limited to the above, and may include a communication apparatus capable of acquiring (receiving) information such as the update data from, for example, the update data creation apparatus 11 and a server that manages the update data.

The map information storage 25 includes, for example, a hard disk drive including a hard disk as a storage medium. The map information storage 25 prestores the map information and information for managing the map information.

The output unit 26 includes, for example a liquid crystal display located on a touch panel, and outputs (presents), for example, the results of the map information processing performed by the controller 27 to the user in accordance with the control by the controller 27. The output unit 26 may be a display apparatus alone that displays, for example, a map, the current position, a retrieved route, guidance information, or search results, or may be an apparatus obtained by, for example, combining the display apparatus and a voice output apparatus that outputs instructions or guidance to the user by voice.

The controller 27 includes, for example, a processor such as a CPU, and updates the map information in the map information storage 25 through the use of the update data acquired by the information acquiring unit 24. Further, the controller 27 performs various kinds of map information processing on the basis of instruction signals provided from the input unit 22, the current position acquired by the position detector 23, and the map information read from the map information storage 25, and causes the output unit 26 to output results of the map information processing and the like.

The map information processing performed by the controller 27 includes; map matching in which the current position of the vehicle is accurately estimated on the basis of the map information and the current position detected by the position detector 23; route computation (route retrieval) in which a route from a departure point such as the current position to a destination is computed; route display in which, together with a road map, appropriate candidate routes obtained by the route retrieval are displayed on the screen of the output unit 26; route guidance in which a way from a departure point such as the current position to a destination is presented in accordance with a route selected from the candidate routes by the user or the like; processing of displaying a map around the current position or the like; and various kinds of search processing through the use of, for example, names of facilities, addresses, and telephone numbers.

<Operation>

Figure 8:
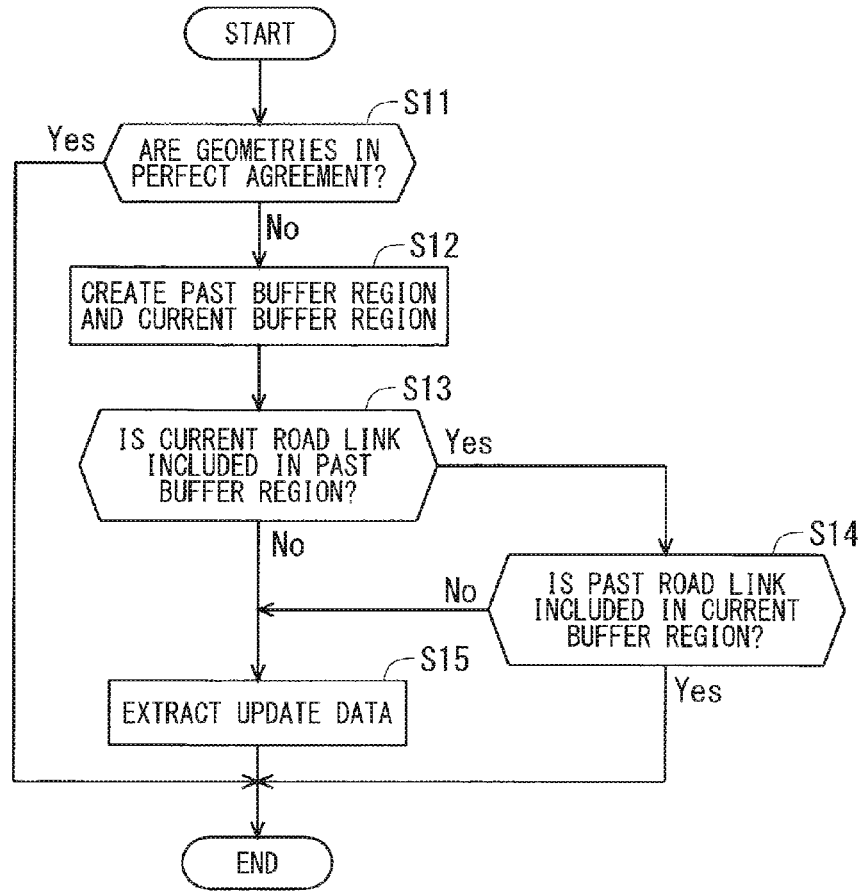
FIG. 8 A flowchart showing an example of operation of the update data creation apparatus according to the second preferred embodiment.

FIG. 8 is a flowchart showing an example of operation of the update data creation apparatus 11 according to the second preferred embodiment. With reference to FIG. 8, the following describes operation of the update data creation apparatus 11 in creating the update data. Assume that the operation shown in FIG. 8 is performed on the individual road links at all levels of the hierarchy of the map information.

In Step S11, the data extractor 3 determines (checks) whether the geometry of the past map information 2a and the geometry of the current map information 2b are in perfect agreement. If it is determined that the geometries are not in perfect agreement, the operation proceeds to Step S12. If it is determined that the geometries are in perfect agreement, the operation in FIG. 8 is ended.

In Step S12, the data extractor 3 creates, as the past buffer region 91, a buffer region obtained by extending the shape of the past road link 81 included in the past map information 2a by the buffer distance r. Similarly, the data extractor 3 creates, as a current buffer region 96, a buffer region obtained by extending the shape of the current road link 86 included in the current map information 2b by the buffer distance r. Although the following description will be given assuming that the buffer distance r of the past buffer region 91 is equal to the buffer distance r of the current buffer region 96, the buffer distances r may be different from each other.

FIGS. 9A and 9B are diagrams for describing an example of operation of the data extractor 3 in creating a buffer region in Step S12. With reference to FIGS. 9A and 9B, the following describes operation of creating the past buffer region 91 from the past road link 81 and operation of creating the current buffer region 96 from the current road link 86.

As shown in FIG. 9A, the data extractor 3 creates the past buffer region 91 on the basis of a circle 91a having a radius equal to the buffer distance r set by the distance setting unit 5, with the center of the circle 91a being located on the past road link 81. For example, the data extractor 3 creates, as the past buffer region 91, a region obtained by superimposing the centers of a plurality of circles 91a on the past road link 81 with no gap therebetween and adding inner regions of the plurality of circles 91a. Similarly, as shown in FIG. 9B, the data extractor 3 creates the current buffer region 96 on the basis of a circle 96a having a radius equal to the buffer distance r set by the distance setting unit 5, with the center of the circle 96a being located on the current road link 86.

Referring back to FIG. 8, in Step S13, the data extractor 3 determines whether the current road link 86 is completely included in the past buffer region 91. If it is determined that the current road link 86 is completely included in the past buffer region 91, the operation proceeds to Step S14. If it is determined that the current road link 86 is not completely included in the past buffer region 91 and that at least a part of the current road link 86 is located outside the past buffer region 91, the operation proceeds to Step S15.

In Step S14, the data extractor 3 determines whether the past road link 81 is completely included in the current buffer region 96. If it is determined that the past road link 81 is completely included in the current buffer region 96, the relevant road links, in other words, the road links that have differences but have been determined to be included in the relevant buffer regions in Steps S13 and S14 are stored in a memory (not shown), and then the operation in FIG. 8 is ended. If it is determined that the past road link 81 is not completely included in the current buffer region 96 and that at least a part of the past road link 81 is located outside the current buffer region 96, the operation proceeds to Step S15.

In Step S15, the data extractor 3 extracts, as the update data, a difference between the shape of the past road link 81 and the shape of the current road link 86. Subsequently, the operation in FIG. 8 is ended.

As described above, the data extractor 3 according to the second preferred embodiment is configured to extract the above-mentioned difference as the update data, even though the current road link 86 (one road link) is included in the past buffer region 91 obtained by extending the shape of the past road link 81 (the other road link) by the buffer distance r, in a case where the past road link 81 (the other road link) is not included in the current buffer region 96 obtained by extending the shape of the current road link 86 (the one road link) by the buffer distance r.

FIG. 10 is a flowchart showing an example of a method for adjusting update data in the update data creation apparatus 11 according to the second preferred embodiment. With reference to FIG. 10, the following describes the method for adjusting update data.

In Step S21, the display controller 7 causes the display unit 6 to display the update status of the past map information 2a on the basis of the update data. At this time, the display controller 7 causes the display unit 6 to display a road link from which the above-mentioned difference has been extracted as the update data, a road link stored in the memory (a road link from which the above-mentioned existing difference has not been extracted as the update data), and a road link other than the above-mentioned road links (in this case, a road link that does not have the above-mentioned difference) to be distinguishable from one another. The past map information 2a is updated through the use of, for example, the most recently created update data.

Figure 11:
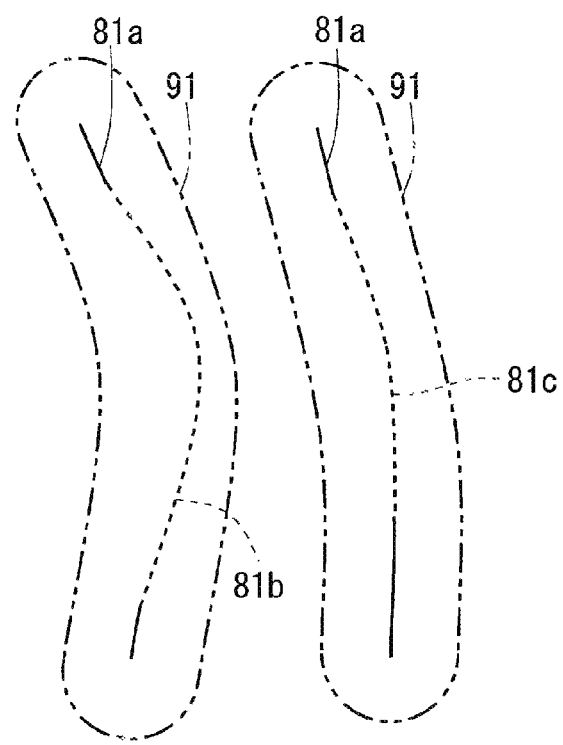
FIG. 11 A diagram for describing an example of the method for adjusting update data according to the second preferred embodiment.

FIG. 11 shows an example of display of the display unit 6 in Step S21. As for the updated past map information 2a, a road link 81a that does not have the above-mentioned difference is shown by a solid line, and each of road links 81b and 81c from which the above-mentioned existing difference has not been extracted as the update data is shown by a broken line. This means that the road link 81a and the road links 81b and 81c are displayed in a distinguishable manner according to types of lines such as a solid line and a broken line. The displaying of different types of road links to be distinguishable from one another is not limited to the above. Different types of road links may be shown in different colors or in different thicknesses (widths) such that the types of road links are distinguishable from one another. It is not required that the past buffer region 91, which is shown by an alternate long and two short dashes line in FIG. 11, be displayed in Step S21.

Referring back to FIG. 10, in Step S22, the user inputs a distance different from the current buffer distance r to the input unit 4. The distance setting unit 5 sets, as the buffer distance r, the distance received by the input unit 4 from the user. The buffer distance r is changed accordingly.

In Step S23, the data extractor 3 extracts (creates) update data by performing the operation described with reference to FIGS. 9A and 9B, using the buffer distance r set in Step S22.

In Step S24, the display controller 7 causes the display unit 6 to display, as in Step S21, updated information on the past map information 2a on the basis of the update data extracted in Step S23.

Figure 12:
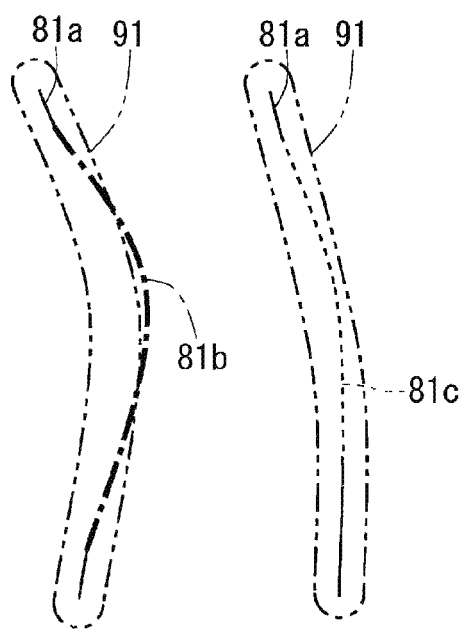
FIG. 12 A diagram for describing an example of the method for adjusting update data according to the second preferred embodiment.

HG. 12 shows an example of display of the display unit 6 in Step S24. The past buffer region 91 in FIG. 12 is narrower than the past buffer region 91 in FIG. 11 due to the reduction in the buffer distance r in Step S22.

Thus, as for the past map information 2a, the road link 81a that does not have the above-mentioned difference is shown by a solid line, the road link 81b from which the above-mentioned difference has been extracted as the update data is shown by an alternate long and short dash line, and the road link 81c from which the above-mentioned existing difference has not been extracted as the update data is shown by a broken line.

This means that the road link 81a, the road link 81b, and the road link 81c are displayed to be distinguishable from one another according to the types of lines. It is not required that the past buffer region 91, which is shown by the long and two short dashes line in FIG. 12, be displayed in Step S24.

<Effects>

Similarly to the map information processing apparatus 1 according to the first preferred embodiment, the update data creation apparatus 11 according to the second preferred embodiment described above can reduce the size of the update data.

In the second preferred embodiment, the data extractor 3 creates a buffer region (the past buffer region 91 or the current buffer region 96) on the basis of a circle having a radius equal to the buffer distance r, with the center of the circle being located on a road link (the past road link 81 or the current road link 86). This facilitates mathematical operations (computation) for creating the buffer region.

In the second preferred embodiment, a road link from which the above-mentioned difference has been extracted as the update data, a road link from which the above-mentioned existing difference has not been extracted as the update data, and a road link other than the above-mentioned road links are displayed to be distinguishable from one another. Thus, the user of the update data creation apparatus 11 can adjust the buffer distance r as appropriate while viewing the display contents, and can determine whether the difference should be extracted as the update data accordingly.

In a case where the shape of the current road link 86 is changed to be shorter than the shape (such as a liner shape) of the past road link 81, even though the shape of the current road link 86 is significantly changed, the current road link 86 is still included in the past buffer region 91. Thus, in some cases, such a significant change associated with a road link cannot be extracted as the update data in the first preferred embodiment.

In the second preferred embodiment, meanwhile, the above-mentioned difference is extracted as the update data, even though the current road link 86 is included in the past buffer region 91, in a case where the past road link 81 is not included in the current buffer region 96. Even when a road link changes in the above-mentioned manner, a significant difference (change) associated with the road link can be extracted as the update data.

The processing of creating both the past buffer region 91 and the current buffer region 96 requires a relatively large amount of computation and the processing speed declines accordingly. Thus, as in the second preferred embodiment, it is preferred that a determination whether the geometry of the past map information 2a and the geometry of the current map information 2b are in perfect agreement be made (Step S11) before creating the past buffer region 91 and the current buffer region 96 (Step S12). Making a determination in such a manner can reduce the number of the past buffer regions 91 and the current buffer regions 96 to be created, and regulate the decline in processing speed accordingly.

<Third Preferred Embodiment>

The update data creation apparatus 11 according to a third preferred embodiment of the present invention has a block configuration identical to the block configuration in the second preferred embodiment, and thus the illustration thereof is omitted. The constituent elements of the update data creation apparatus 11 according to the third preferred embodiment that are identical or similar to the above-described constituent elements are denoted by the same reference signs, and the following description will be given focusing on the points of difference.

<Configuration>

The following description will be given assuming that the past map information 2a includes additional information on the past road link 81 and that the current map information 2b includes additional information on the current road link 86, which is not limited thereto. It is only required that the past map information 2a or the current map information 2b include the additional information on the relevant road link.

The following description will be given assuming that the additional information on a road link includes area attribute information associated with the road link and that the area attribute information refers to information for identifying the area including the road link as an urban area or an area other than urban areas (such as a mountainous area).

Figure 14:
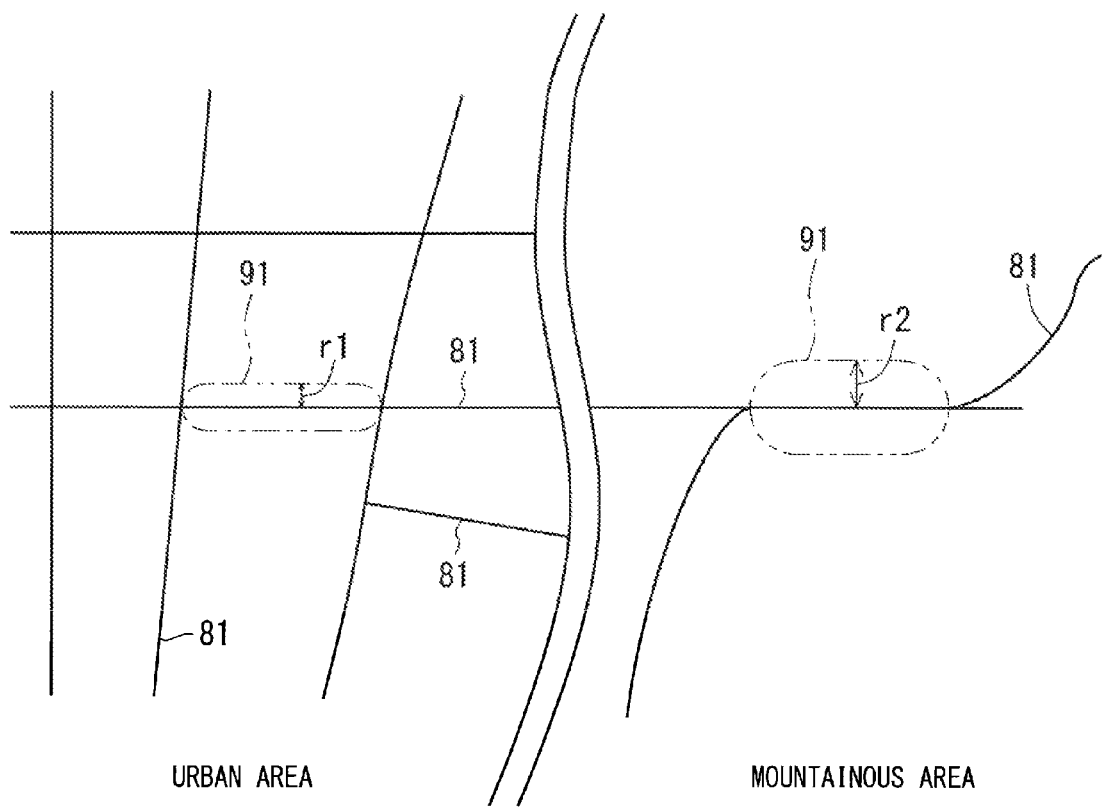
FIG. 14 A diagram for describing an example of operation of the update data creation apparatus according to the third preferred embodiment.

The distance setting unit 5 changes the buffer distance r on the basis of the area attribute information associated with the road link. In particular, as shown in FIG. 14, which will be described below in detail, the distance setting unit 5 changes the buffer distance r of the past buffer region 91 into a buffer distance r1 in a case where the area attribute information associated with the past road link 81 refers to an urban area. The distance setting unit 5 changes the buffer distance r of the past buffer region 91 into a buffer distance r2 in a case where the area attribute information associated with the past road link 81 refers to a mountainous area (the buffer distance r1<the buffer distance r2). Similarly, the distance setting unit 5 changes the buffer distance r of the current buffer region 96 into the buffer distance r1 or the buffer distance r2 on the basis of the area attribute information associated with the current road link 86.

To implement the distance setting unit 5 in such a manner, a table in which the area attribute information (an urban area and a mountainous area) is correlated with the buffer distances r (the buffer distances r1 and r2) may be included in the distance setting unit 5.

<Operation>

Figure 13:
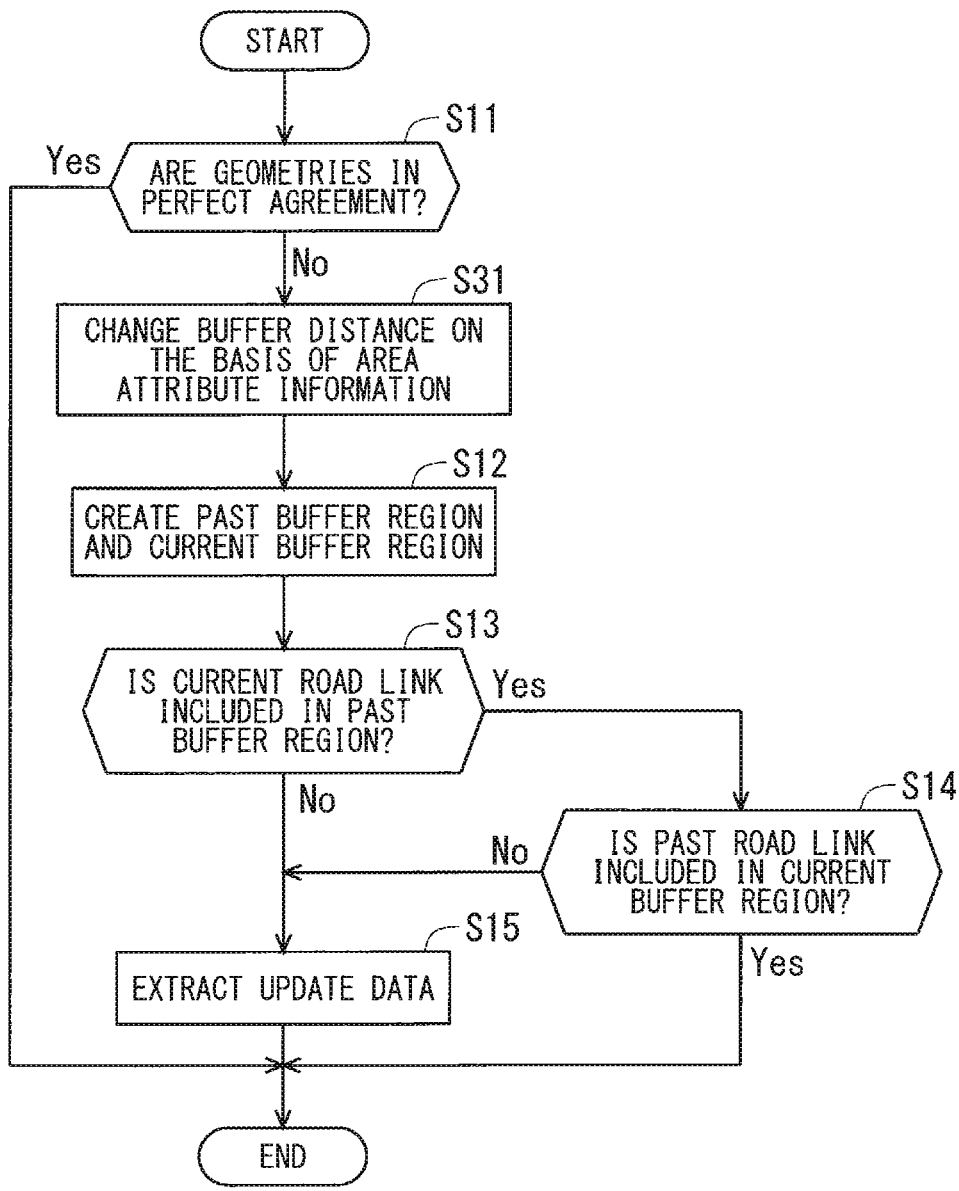
FIG. 13 A flowchart showing an example of operation of the update data creation apparatus according to a third preferred embodiment.

FIG. 13 is a flowchart showing an example of operation of the update data creation apparatus 11 according to the third preferred embodiment. The flowchart in FIG. 13 is obtained by inserting Step S31 between Step S11 and Step S12 of the flowchart in FIG. 8, and thus Step S31 will be mainly described below.

As in the second preferred embodiment, the data extractor 3 determines (checks), in Step S11, whether the geometries are in perfect agreement. If it is determined that the geometries are not in perfect agreement, the operation proceeds to Step S31. If it is determined that the geometries are in perfect agreement, the operation in FIG. 13 is ended.

In Step S31, the distance setting unit 5 changes the buffer distance r for use in creating the past buffer region 91 into the buffer distance r1 or the buffer distance r2 on the basis of the area attribute information associated with the past road link 81. Similarly, the distance setting unit 5 changes the buffer distance r for use in creating the current buffer region 96 into the buffer distance r1 or the buffer distance r2 on the basis of the area attribute information associated with the current road link 86.

Subsequently, in Step S12, the data extractor 3 creates the past buffer region 91 obtained by extending the shape of the past road link 81 by the buffer distance r in Step S31 (the buffer distance r1 or the buffer distance r2 in this case). Similarly, the data extractor 3 creates the current buffer region 96 obtained by extending the shape of the current road link 86 by the buffer distance r in Step S31 (the buffer distance r1 or the buffer distance r2 in this case). Then, the operation is performed as in the second preferred embodiment.

FIG. 14 is a diagram for describing an example of operation of the data extractor 3 in creating the buffer regions in Step S12. With reference to FIG. 14, the following describes operation of creating the past buffer region 91 from the past road link 81. Description of the operation of creating the current buffer region 96 from the current road link 86 is omitted because the operation is similar to the operation which will be described below.

FIG. 14 shows, out of the past road links 81, a road link 81 whose area attribute information refers to an urban area and a road link 81 whose area attribute information refers to a mountainous area on the same scale. The area between these road links 81 is omitted from the drawing.

As shown in FIG. 14, the data extractor 3 creates the past buffer region 91 obtained by extending the shape of the road link 81 whose area attribute information refers to an urban area by the buffer distance r1. Further, the data extractor 3 creates the past buffer region 91 obtained by extending the shape of the road link 81 whose area attribute information refers to a mountainous area by the buffer distance r2 greater than the buffer distance r1.

<Effects>

The update data creation apparatus 11 according to the third preferred embodiment mentioned above is capable of not only producing effects similar to the effects in the second preferred embodiment but also correcting the buffer distance r automatically.

The distance setting unit 5 having the above-mentioned configuration may be configured not to set, as the buffer distance r, the distance received by the input unit 4.

The distance setting unit 5 having such a configuration is still capable of correcting the buffer distance r to some extent. The layout of road links on the actual map varies depending on various factors, and thus, in some cases, it is not appropriate to change the buffer distance r invariably on the basis of the area attribute information. Preferably, the distance setting unit 5 is configured to set, as the buffer distance r, the distance received by the input unit 4 as appropriate after changing the buffer distance r automatically on the basis of the area attribute information.

<Fourth Preferred Embodiment>

The update data creation apparatus 11 according to a fourth preferred embodiment of the present invention has a block configuration identical to the block configuration in the second preferred embodiment, and thus the illustration thereof is omitted. The constituent elements of the update data creation apparatus 11 according to the fourth preferred embodiment that are identical or similar to the above-described constituent elements are denoted by the same reference signs, and the following description will be given focusing on the points of difference.

<Configuration>

In the third preferred embodiment mentioned above, the additional information on a road link has included area attribute information associated with the road link. The description in the fourth preferred embodiment will be given assuming that the additional information on a road link includes road attribute information associated with the road link and that the road attribute information refers to information for identifying a road associated with the road link as an expressway, an open road, or a narrow street.

Figure 16:
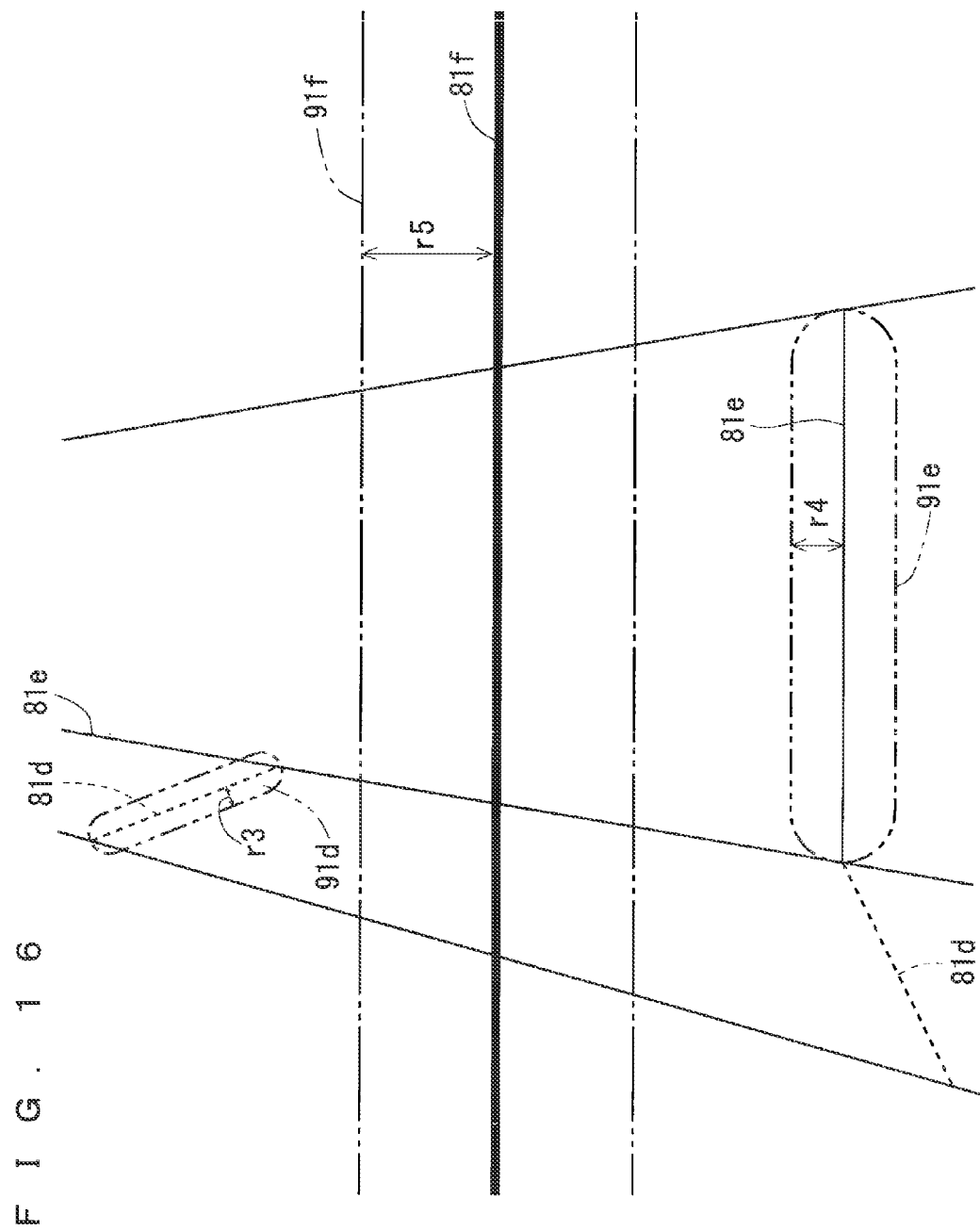
FIG. 16 A diagram for describing an example of operation of the update data creation apparatus according to the fourth preferred embodiment.

The distance setting unit 5 changes the buffer distance r on the basis of the road attribute information associated with a road link. In particular, as shown in FIG. 16 which will be described below in detail, the distance setting unit 5 changes the buffer distance r of the past buffer region 91 into a buffer distance r3 in a case where the road attribute information associated with the past road link 81 refers to a narrow street. The distance setting unit 5 changes the buffer distance r of the past buffer region 91 into a buffer distance r4 in a case where the road attribute information associated with the past road link 81 refers to an open road. The distance setting unit 5 changes the buffer distance r of the past buffer region 91 into a buffer distance r5 in a case where the road attribute information associated with the past road link 81 refers to an expressway (the buffer distance r3<the buffer distance r4<the buffer distance r5). Similarly, the distance setting unit 5 changes the buffer distance r of the current buffer region 96 into the buffer distance r3, r4, or r5 on the basis of the road attribute information associated with the current road link 86.

To implement the distance setting unit 5 in such a manner, a table in which the road attribute information (a narrow street, an open road, and an expressway) is correlated with the buffer distances r (the buffer distances r3, r4, and r5) may be included in the distance setting unit 5.

<Operation>

Figure 15:
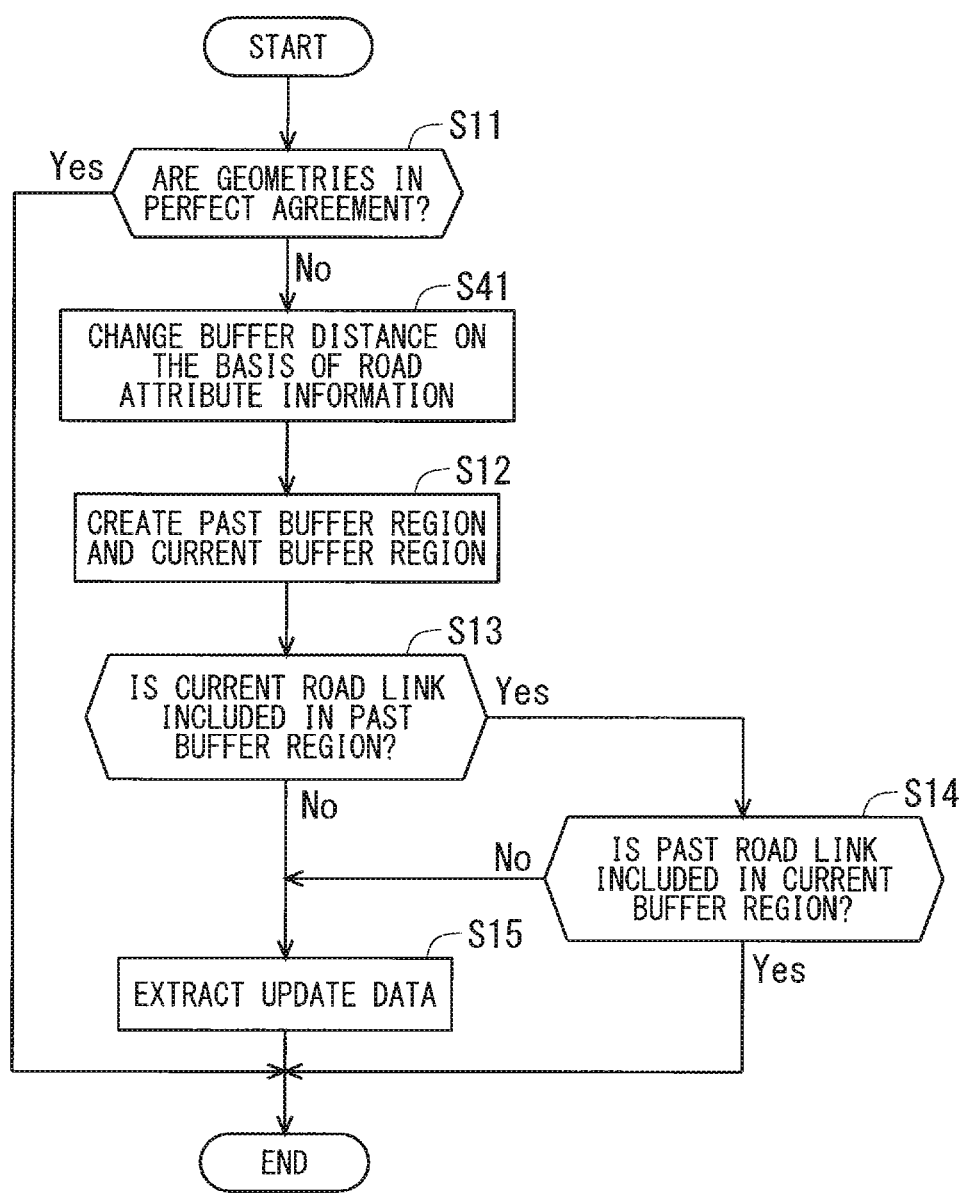
FIG. 15 A flowchart showing an example of operation of the update data creation apparatus according to a fourth preferred embodiment.

FIG. 15 is a flowchart showing an example of operation of the update data creation apparatus 11 according to the fourth preferred embodiment. The flowchart in FIG. 15 is obtained by inserting Step S41 between Step S11 and Step S12 of the flowchart in FIG. 8, and thus Step S41 will be mainly described below.

As in the second preferred embodiment, the data extractor 3 determines (checks), in Step S11, whether the geometries are in perfect agreement. If it is determined that the geometries are not in perfect agreement, the operation proceeds to Step S41. If it is determined that the geometries are in perfect agreement, the operation in FIG. 15 is ended.

In Step S41, the distance setting unit 5 changes the buffer distance r for use in creating the past buffer region 91 into the buffer distance r3, r4, or r5 on the basis of the road attribute information associated with the past road link 81. Similarly, the distance setting unit 5 changes the buffer distance r for use in creating the current buffer region 96 into the buffer distance r3, r4, or r5 on the basis of the road attribute information associated with the current road link 86.

Subsequently, in Step S12, the data extractor 3 creates the past buffer region 91 obtained by extending the shape of the past road link 81 by the buffer distance r in Step S41 (the buffer distance r3, r4, or r5 in this case). Similarly, the data extractor 3 creates the current buffer region 96 obtained by extending the shape of the current road link 86 by the buffer distance r in Step S41 (the buffer distance r3, r4, or r5 in this case). Then, the operation is performed as in the second preferred embodiment.

FIG. 16 is a diagram for describing an example of operation of the data extractor 3 in creating buffer regions in Step S12. With reference to FIG. 16, the following describes the operation of creating the past buffer region 91 from the past road link 81. Description of the operation of creating the current buffer region 96 from the current road link 86 is omitted because the operation is similar to the operation which will be described below.

With reference to FIG. 16, out of the past road links 81, a road link 81d whose road attribute information refers to a narrow street is shown by a broken line, a road link 81e whose road attribute information refers to an open road is shown by a solid line, and a road link 81f whose road attribute information refers to an expressway is shown by a wide line.

As shown in FIG. 16, the data extractor 3 creates a past buffer region 91d obtained by extending the shape of the road link 81d (a narrow street) by the buffer distance r3. The data extractor 3 creates a past buffer region 91e obtained by extending the shape of the road link 81e (an open road) by the buffer distance r4 greater than the buffer distance r3. The data extractor 3 creates a past buffer region 91f obtained by extending the shape of the road link 81f (an expressway) by the buffer distance r5 greater than the buffer distance r4.

<Effects>

The update data creation apparatus 11 according to the fourth preferred embodiment mentioned above is capable of not only producing effects similar to the effects in the second preferred embodiment but also correcting the buffer distance r automatically.

The distance setting unit 5 having the above-mentioned configuration may be configured not to set, as the buffer distance r, the distance received by the input unit 4. The distance setting unit 5 having such a configuration is still capable of correcting the buffer distance r to some extent. The layout of road links on the actual map varies depending on various factors, and thus, in some cases, it is not appropriate to change the buffer distance r invariably on the basis of the road attribute information. Preferably, the distance setting unit 5 is configured to set, as the buffer distance r, the distance received by the input unit 4 as appropriate after changing the buffer distance r automatically on the basis of the road attribute information.

The distance setting unit 5 may change the buffer distance r on the basis of the area attribute information according to the third preferred embodiment and the road attribute information according to the fourth preferred embodiment. To implement the distance setting unit 5 in such a manner, a table in which the a plurality of pairs (six pairs) obtained by combining the area attribute information (an urban area and an area other than urban areas) and the road attribute information (a narrow street, an open road, and an expressway) are correlated with a plurality of buffer distances r (buffer distances r11, r12, r13, r14, r15, and r16) may be included in the distance setting unit 5.

<Fifth Preferred Embodiment>

The update data creation apparatus 11 according to a fifth preferred embodiment of the present invention has a block configuration identical to the block configuration in the second preferred embodiment, and thus the illustration thereof is omitted. The constituent elements of the update data creation apparatus 11 according to the fifth preferred embodiment that are identical or similar to the above-described constituent elements are denoted by the same reference signs, and the following description will be given focusing on the points of difference.

<Configuration>

In the fifth preferred embodiment, the distance setting unit 5 changes the buffer distance r of the past buffer region 91 on the basis of the distance between the parallel road links 81 out of the past road links 81. In particular, as shown in FIG. 18, which will be described below in detail, the distance setting unit 5 reduces the buffer distance r of the past buffer region 91 as the distance between the parallel road links 81 decreases. The distance setting unit 5 extends the buffer distance r of the past buffer region 91 as the distance between the parallel road links 81 increases. Similarly, the distance setting unit 5 changes the buffer distance r of the current buffer region 96 on the basis of the distance between the parallel road links 86 out of the current road links 86. Note that "parallel" in the description means "side by side," and includes the mathematical concept of being parallel or the state of being approximately parallel.

To implement the distance setting unit 5 in such a manner, a table in which the distance between road links is correlated with the buffer distance r may be included in the distance setting unit 5, or a function representing the relation between the buffer distance r and the distance between road links may be included in the distance setting unit 5.

<Operation>

Figure 17:
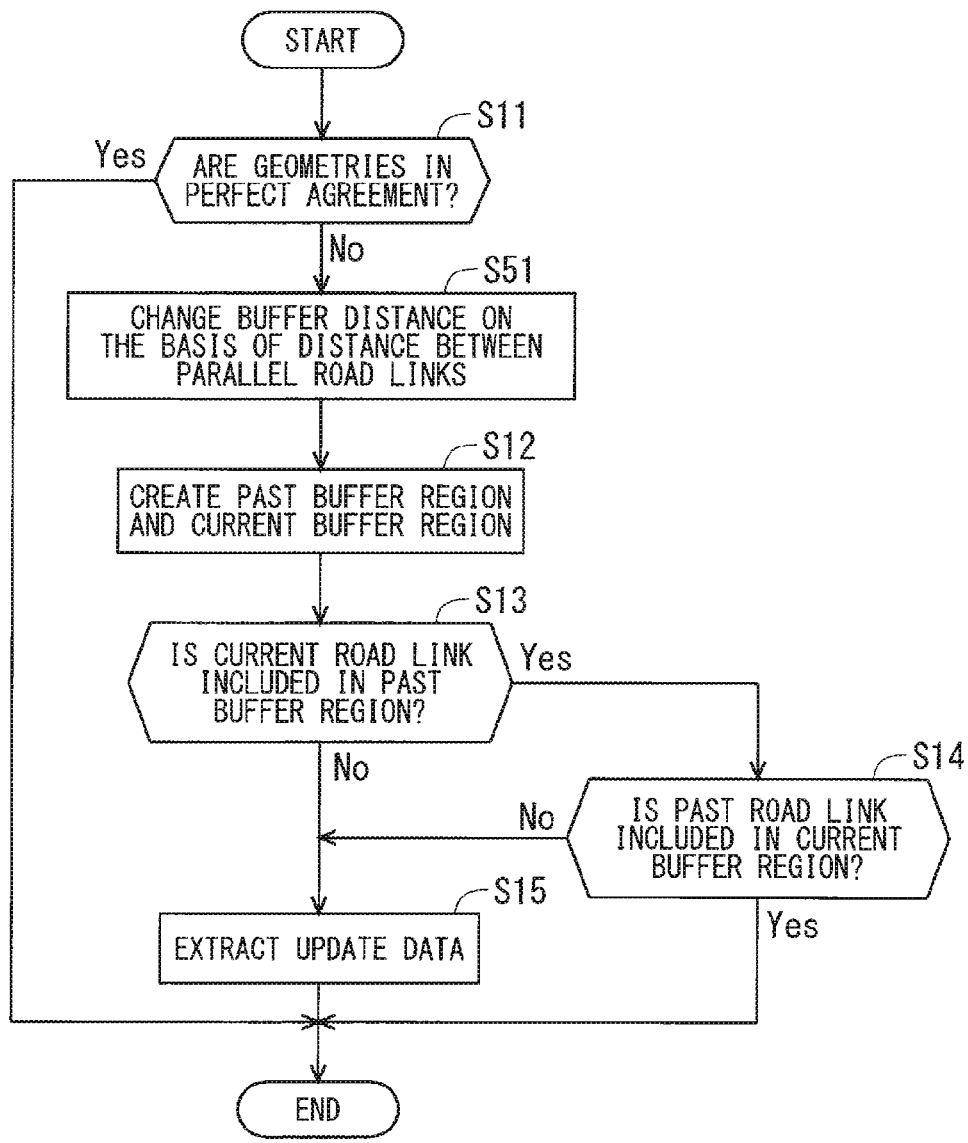
FIG. 17 A flowchart showing an example of operation of the update data creation apparatus according to a fifth preferred embodiment.

FIG. 17 is a flowchart showing an example of operation of the update data creation apparatus 11 according to the fifth preferred embodiment. The flowchart in FIG. 17 is obtained by inserting Step S51 between Step S11 and Step S12 of the flowchart in FIG. 8, and thus Step S51 will be mainly described below.

As in the second preferred embodiment, the data extractor 3 determines (checks), in Step S11, whether the geometries are in perfect agreement. If it is determined that the geometries are not in perfect agreement, the operation proceeds to Step S51. If it is determined that the geometries are in perfect agreement, the operation in FIG. 17 is ended.

In Step S51, the distance setting unit 5 changes the buffer distance r for use in creating the past buffer region 91 on the basis of the distance between the parallel road links 81 out of the past road links 81. Similarly, the distance setting unit 5 changes the buffer distance r for use in creating the current buffer region 96 on the basis of the distance between the parallel road links 86 out of the current road links 86.

Subsequently, in Step S12, the data extractor 3 creates the past buffer region 91 obtained by extending the shape of the past road link 81 by the buffer distance r in Step S51. Similarly, the data extractor 3 creates the current buffer region 96 obtained by extending the shape of the current road link 86 by the buffer distance r in Step S51. Then, the operation is performed as in the second preferred embodiment.

FIG. 18 is a diagram for describing an example of operation of the data extractor 3 in creating the buffer regions in Step S12. With reference to FIG. 18, the following describes the operation of creating the past buffer region 91 from the past road link 81. The operation of creating the current buffer region 96 from the current road link 86 is omitted because the operation is similar to the operation which will be described below.

FIG. 18 shows past road links 81g, 81h, 81i, 81j, 81k and 81l. The road link 81g is parallel with the road links 81h and 81i, and the road link 81j is parallel with the road links 81k and 81l. The following description will be given assuming that the distances between road links from shortest to longest are in the following order: the distance between the road link 81j and the road link 81k; the distance between the road link 81g and the road link 81h; and the distance between the road link 81j and the road link 81l and that the distance between the road link 81g and the road link 81h is equal to the distance between the road link 81g and the road link 81i.

The distance setting unit 5 compares the distance between the road link 81j and the road link 81k to the distance between the road link 81j and the road link 81l. Then, the distance setting unit 5 changes the buffer distance r of a past buffer region 91j associated with the road link 81j on the basis of the shorter distance (the distance between the road link 81j and the road link 81k in this case).

Further, the distance setting unit 5 changes the buffer distance r of a past buffer region 91g associated with the road link 81g on the basis of the distance between the road link 81g and the road link 81h (or the distance between the road link 81g and the road link 81i). As described above, the distance setting unit 5 according to the fifth preferred embodiment reduces the buffer distance r of the past buffer region 91 as the distance between the parallel road links 81 decreases. Consequently, the buffer distance r of the past buffer region 91j associated with the road link 81j is shorter than the buffer distance r of the past buffer region 91g associated with the road link 81g.

<Effects>

The update data creation apparatus 11 according to the fifth preferred embodiment mentioned above is capable of not only producing effects similar to the effects in the second preferred embodiment but also correcting the buffer distance r automatically.

The distance setting unit 5 having the above-mentioned configuration may be configured not to set, as the buffer distance r, the distance received by the input unit 4.

The distance setting unit 5 having such a configuration is still capable of correcting the buffer distance r to some extent. The layout of road links on the actual map varies depending on various factors, and thus, in some cases, it is not appropriate to change the buffer distance r invariably on the basis of the distance between parallel road links. Preferably, the distance setting unit 5 is configured to set, as the buffer distance r, the distance received by the input unit 4 as appropriate after changing the buffer distance r automatically on the basis of the distance between parallel road links.

The distance setting unit 5 may change the buffer distance r on the basis of the area attribute information according to the third preferred embodiment, the road attribute information according to the fourth preferred embodiment, and the distance between parallel road links according to the fifth preferred embodiment.

<Sixth Preferred Embodiment>

The update data creation apparatus 11 according to a sixth preferred embodiment of the present invention has a block configuration identical to the block configuration in the second preferred embodiment, and thus the illustration thereof is omitted. The constituent elements of the update data creation apparatus 11 according to the sixth preferred embodiment that are identical or similar to the above-described constituent elements are denoted by the same reference signs, and the following description will be given focusing on the points of difference.

<Configuration>

In a sixth preferred embodiment, turnaround points are defined as nodes that link a plurality of road links adjacent to each other in such a manner that an angle formed by the plurality of road links is equal to or greater than a predetermined angle. The data extractor 3 according to the sixth preferred embodiment is configured to extract the above-mentioned difference as the update data, even though the data extractor 3 does not extract the above-mentioned difference as the update data with reference to buffer regions, in a case where the number of turnaround points of the current road link 86 is smaller than the number of turnaround points of the past road link 81.

<Operation>

Figure 19:
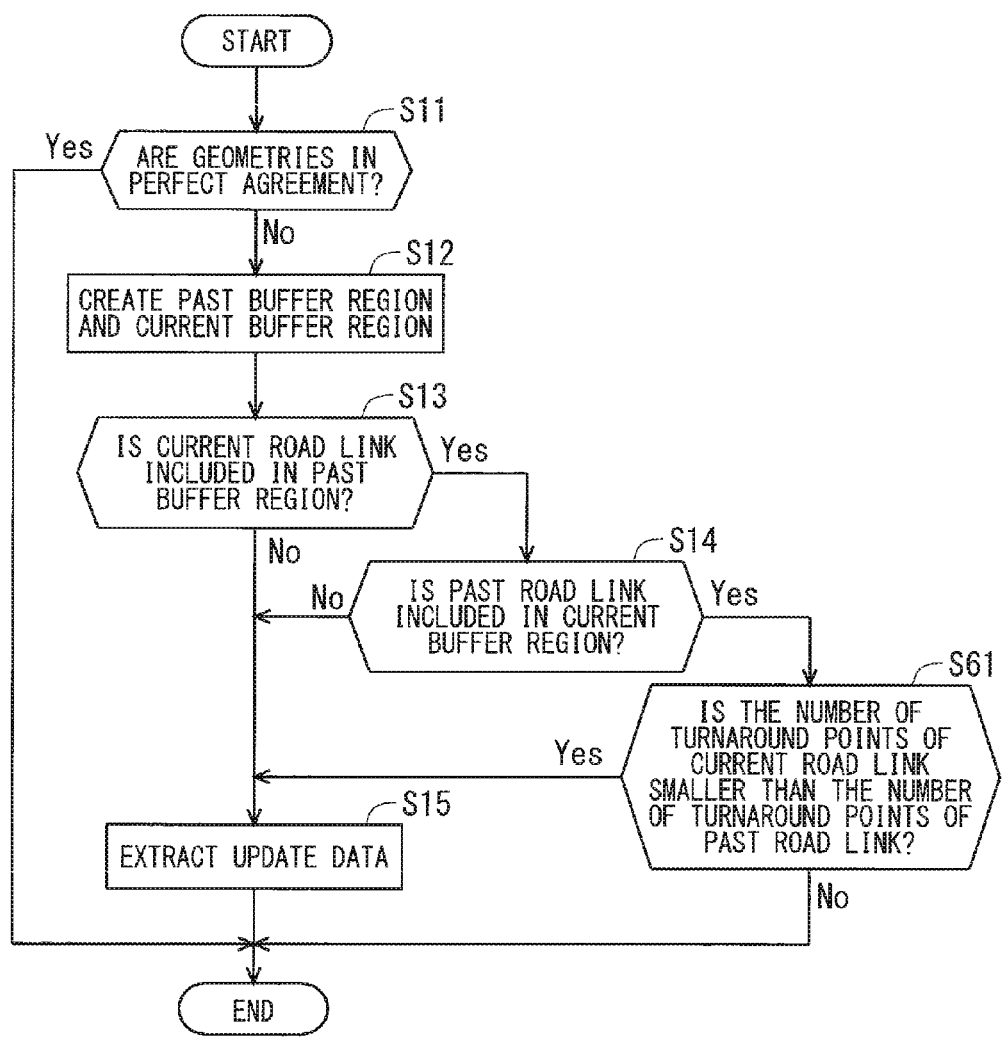
FIG. 19 A flowchart showing an example of operation of the update data creation apparatus according to a sixth preferred embodiment.

FIG. 19 is a flowchart showing an example of operation of the update data creation apparatus 11 according to the sixth preferred embodiment. The flowchart shown in FIG. 19 is obtained by adding Step S61 after Step S14 of the flowchart shown in FIG. 8, and thus Step S61 will be mainly described below.

The operation in Steps S11 to S13 is performed as in the corresponding steps in the second preferred embodiment. In Step S14, the data extractor 3 determines whether the past road link 81 is completely included in the current buffer region 96. If it is determined that the past road link 81 is completely included in the current buffer region 96, the operation proceeds to Step S61. If it is determined that the past road link 81 is not completely included in the current buffer region 96 and that at least a part of the past road link 81 is located outside the current buffer region 96, the operation proceeds to Step S15.

In a case where the operation proceeds from Step S14 to Step S61, or equivalently, in a case where the update data is not extracted through the use of the past buffer region 91 and the current buffer region 96, the data extractor 3 determines, in Step S61, whether the number of turnaround points of the current road link 86 is smaller than the number of turnaround points of the past road link 81. If it is determined that the number of turnaround points of the current road link 86 is smaller, the operation proceeds to Step S15. If it is determined that the number of turnaround points of the current road link 86 is not smaller, the operation in FIG. 19 is ended.

Figure 20:
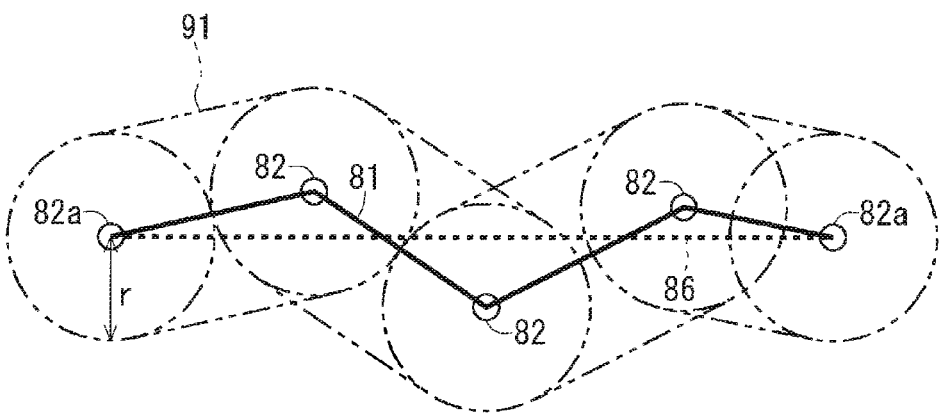
FIG. 20 A diagram for describing an example of operation of the update data creation apparatus according to the sixth preferred embodiment.

FIG. 20 is a diagram for describing an example of operation of the update data creation apparatus 11 according to the sixth preferred embodiment. FIG. 20 shows the past road link 81 (a solid line), turnaround points 82, nodes 82a that are not the turnaround points 82, the current road link 86 (a broken line), and the past buffer region 91.

The four past road links 81 are linked via three turnaround points 82. This means that the number of the turnaround points 82 of the past road link 81 is three. Meanwhile, one current road link 86 corresponding to the four past road links 81 mentioned above includes no turnaround points 82. This means that the number of the turnaround points 82 of the current road link 86 is zero. In the example shown in FIG. 20, the number of turnaround points of the current road link 86 is smaller than the number of turning points of the past road link 81, and thus the difference is extracted as the update data.

<Effects>

In response to a shift from the past road link 81 having a greater number of turning points (a greater number of zigzags) to the current road link 86 having a smaller number of turning points (a smaller number of zigzags), the update data creation apparatus 11 according to the sixth preferred embodiment mentioned above can extract such a difference as the update data. Updating the map information on the basis of the extracted data can provide the current map information having a smaller data size.

According to the above description, in a case where the number of turnaround points of the current road link 86 is smaller than the number of turnaround points of the past road link 81, the data extractor 3 extracts the difference as the update data. Alternatively, the data extractor 3 may be configured to extract the above-mentioned difference as the update data in a case where the number of turnaround points of the current road link 86 is smaller by a predetermined number than the number of turnaround points of the past road link 81. In the data extractor 3 having such a configuration, the number received by the input unit 4 may be set as the predetermined number.

<First Modification>

In a first modification, the map information processing apparatus according to the present invention is applied to a navigation apparatus. The following describes the configuration in which the map information processing apparatus is applied to the navigation apparatus 21 described in the second preferred embodiment.

Figure 21:
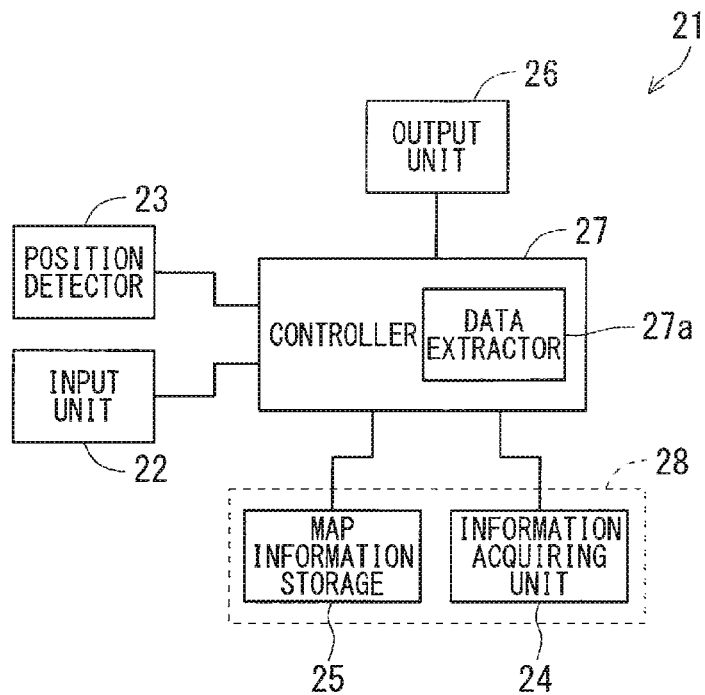
FIG. 21 A block diagram showing an example of a configuration of a navigation apparatus according to a first modification.

FIG. 21 is a block diagram showing an example of a configuration of the navigation apparatus 21 according to the first modification. The CPU implementing the functions of the controller 27 executes programs stored in a memory (not shown) and the like of the navigation apparatus 21, and the functions of a data extractor 27a are implemented in the navigation apparatus 21 accordingly.

The information acquiring unit 24 acquires current map information including a current road link from the outside of the navigation apparatus 21 through, for example, a memory card. The map information storage 25 stores past map information including a past road link. The information acquiring unit 24 and the map information storage 25 are included in an acquiring unit 28, which is configured to be capable of acquiring the past map information and the current map information.

The data extractor 27a has functions similar to those of the data extractor 3 mentioned above. This means that the data extractor 27a extracts a difference between the shape of a past road link and the shape of a current road link as update data for updating the past map information in the map information storage 25. Note that the data extractor 27a is configured not to extract the above-mentioned difference as the update data in a case where the current road link is included in a buffer region obtained by extending the shape of the past road link by a buffer distance.

The controller 27 updates the past map information stored in the map information storage 25 through the use of the update data extracted by the data extractor 27a and transmits the updated data to another navigation apparatus and the like through, for example, a communication apparatus (not shown).

The navigation apparatus 21 according to the first modification mentioned above can produce effects similar to those of the update data creation apparatus 11 described in the second to sixth preferred embodiments.

<Second Modification>

In a second modification, the map information processing apparatus according to the present invention is applied to a server capable of providing cloud computing services.

Figure 22:
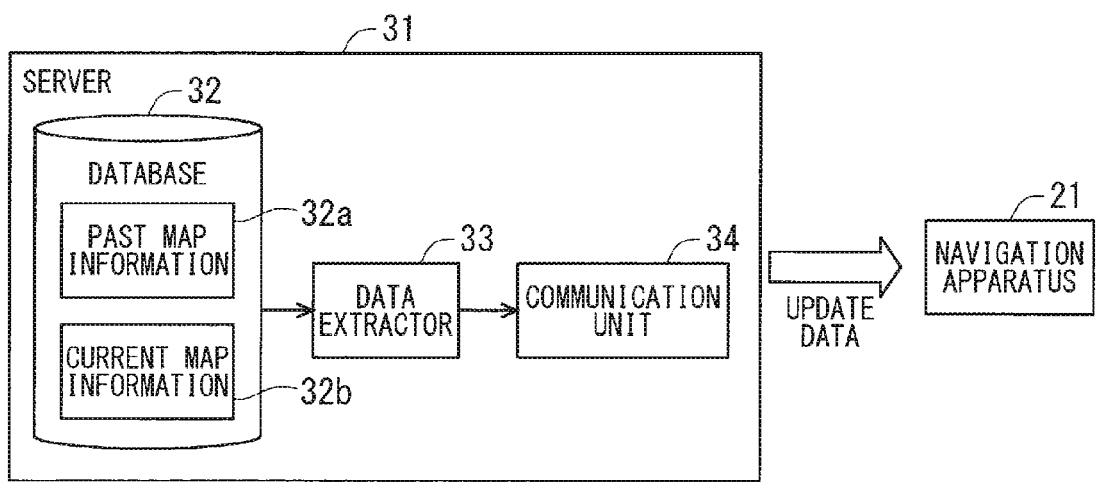
FIG. 22 A block diagram showing an example of a configuration of a server according to a second modification.

FIG. 22 is a block diagram showing an example of a configuration of a server 31 according to a second modification. The server 31 shown in FIG. 22 includes a database 32, a data extractor 33, and a communication unit 34.

The database 32, which is similar to the database 2 mentioned above, acquires past map information 32a including a past road link and current map information 32b including a current road link from the outside of the server 31 and stores the information.

The data extractor 33, which is similar to the data extractor 3, extracts a difference between the shape of a past road link and the shape of a current road link as update data for updating predetermined map information. Note that the data extractor 33 is configured not to extract the above-mentioned difference as the update data in a case where the current road link is included in a buffer region obtained by extending the shape of the past road link by a buffer distance.

The communication unit 34 transmits the update data extracted by the data extractor 33 to the navigation apparatus 21 through radio communication.

The server 31 according to the second modification mentioned above can produce effects similar to those of the update data creation apparatus 11 described in the second to sixth preferred embodiments.

<Other Modifications>

The map information processing apparatus 1 described above is also applicable to the map information processing apparatus formulated as a system by combining, for example, a car navigation apparatus, a portable navigation device (PND), a mobile terminal (such as a mobile phone, a smartphone, and a tablet) that can be mounted on a vehicle, and a server as appropriate. If this is the case, the individual functions or the individual constituent elements of the map information processing apparatus 1 described above (such as the update data creation apparatus 11) are dispersedly located in the devices forming the above-mentioned system.

In the present invention, the above preferred embodiments and the above modifications can be arbitrarily combined, or each preferred embodiment and each modification can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS

1 map information processing apparatus, 2 database, 3 data extractor, 4 input unit, 5 distance setting unit, 6 display unit, 7 display controller, 11 update data creation apparatus, 81 past road link, 86 current road link, 91 past buffer region, 96 current buffer region.

The invention claimed is:

1. A map information processing apparatus comprising:
   a receiver that receives past map information including a past road link and current map information including a current road link; and
   a data extractor that extracts a difference between a shape of said past road link and a shape of said current road link as update data for updating predetermined map information,
   wherein at least one of the current road link and the past road link is characterized with finite width of greater than zero representative of a buffer region, wherein said data extractor does not extract said difference as said update data in a case where one road link of said current road link falls within the path of the other of the current road link and the past road length considered with the finite width representative of the buffer region and only extracts the difference when the current road link of the update data falls outside of the path of the past road link when considered with the buffer region.

2. The map information processing apparatus according to claim 1, wherein said data extractor creates said buffer region on the basis of a circle having a radius equal to said predetermined distance, with the center of said circle being located on said other road link.

3. The map information processing apparatus according to claim 1, further comprising a display controller that causes a display to display said past map information updated on the basis of said update data in such a manner that a first road link from which said difference has been extracted as update data, a second road link from which said difference has not been extracted as update data, and a road link other than said first road link and said second road link are distinguishable from one another.

4. The map information processing apparatus according to claim 1, further comprising a distance setting controller that changes said predetermined distance.

5. The map information processing apparatus according to claim 4, wherein said distance setting controller sets, as said predetermined distance, a distance received.

6. The map information processing apparatus according to claim 4, wherein
   said past map information or said current map information includes additional information on said other road link, and
   said distance setting controller changes said predetermined distance on the basis of said additional information on said other road link.

7. The map information processing apparatus according to claim 6, wherein said additional information on said other road link includes at least one of area attribute information associated with said other road link and road attribute information associated with said other road link.

8. The map information processing apparatus according to claim 4, wherein said distance setting controller changes said predetermined distance on the basis of a distance between parallel road links out of plurality of said other road link.

9. The map information processing apparatus according to claim 1, wherein said data extractor extracts said difference as said update data, even though said data extractor does not extract said difference as said update data with reference to said buffer region, in a case where the number of turnaround points of said current road link is smaller than the number of turnaround points of said past road link, said turnaround points being defined as nodes that link a plurality of road links adjacent to each other in such a manner that an angle formed by said plurality of road links is equal to or greater than a predetermined angle.

10. The map information processing apparatus according to claim 1, wherein said data extractor extracts said difference as said update data on the basis of the buffer region obtained by extending the shape of said past road link by the predetermined distance and the buffer region obtained by extending the shape of said current road link by the predetermined distance.

11. The map information processing apparatus according to claim 10, wherein said data extractor extracts said difference as said update data, even though one road link of said past road link and said current road link is included in a buffer region obtained by extending the shape of the other road link by a predetermined distance, in a case where said other road link is not included in a buffer region obtained by extending the shape of said one road link by a predetermined distance.

12. A method for adjusting update data by said map information processing apparatus according to claim 3, said method comprising the steps of:
   (a) causing said display to display said past map information updated on the basis of said update data in such a manner that a first road link from which said difference has been extracted as update data, a second road link from which said difference has not been extracted as update data, and a road link other than said first road link and said second road link are distinguishable from one another;
   (b) receiving a distance different from said predetermined distance after said step (a) and setting, by distance setting controller, the distance received as said predetermined distance;
   (c) extracting said update data by said data extractor, using said predetermined distance set in said step (b); and
   (d) causing said display to display, as in said step (a), said past map information updated on the basis of said update data extracted in said step (c).

13. A map information processing method comprising the steps of:
   (a) acquiring past map information including a past road link and current map information including a current road link; and
   (b) extracting a difference between a shape of said past road link and a shape of said current road link as update data for updating predetermined map information,
   wherein at least one of the current road link and past road link is characterized with finite width of greater than zero representative of a buffer region, wherein in said step (b), said difference is not extracted as said update data in a case where one road link of said past road link and said current road link falls within the path of the other of said current road and said past road length considered with the finite width representative of the buffer region and only extracts the difference when the current road link of the update data falls outside of the path of the past road link when considered with the buffer region.

* * * * *